Patented June 14, 1927.

1,632,299

UNITED STATES PATENT OFFICE.

GEORG KRÄNZLEIN AND ARTHUR VOSS, OF HOECHST-ON-THE-MAIN, GERMANY, ASSIGNORS TO GRASSELLI DYESTUFF CORPORATION, OF NEW YORK, N. Y., A CORPORATION OF DELAWARE.

PROCESS FOR THE PREPARATION OF MAGNESIUM CHROMATES.

No Drawing. Application filed June 3, 1926. Serial No. 113,552, and in Germany June 22, 1925.

This invention relates to the preparation of magnesium chromates including dichromates.

Heretofore no commercial process for the preparation of magnesium chromates has been discovered. Their preparation from magnesium and chromic acid (Dammer Vol. III, page 580) cannot be considered as such, and even less, the preparation of double salts such as $K_2CrO_4.MgCrO_4$ or $MgCrO_4.MgSO_4$ (Dammer Vol III, page 580 and Gmelin Kraut Vol. III, part 1, page 694).

We have discovered that in the double decomposition of magnesium salts with alkali metal or alkaline earth metal chromates, the formation of double salts can be prevented if magnesium salts of such acids are chosen for double decomposition as form salts with the alkali metals or the alkaline earth metals which are more difficultly soluble in water than magnesium chromates. The double decomposition is carried out in such a way that both salts react with each other in the presence of water. The reaction conditions are so chosen that the more difficultly soluble alkali metal or alkaline earth metal salt, as the case may be, separates out while the magnesium chromate remains in solution. In the case of alkaline earth metal chromates, these conditions are satisfied by treating their aqueous solutions with aqueous solutions of magnesium sulphate at a boiling temperature. In the case of alkali metal chromates, the double decomposition reaction of the aqueous solutions of the two components is carried out in a partial vacuum at the lowest possible temperature. First, the greater part of the alkali metal salt is precipitated, and then the magnesium chromate separates out. Therefore the precipitated salt is first filtered off and then the solution is further evaporated until all of the magnesium chromate separates out. The concentrated solutions of the magnesium chromate may be utilized directly without evaporation for many purposes.

The process of this invention is very important commercially since the magnesium chromate which is produced possesses a large number of advantages over the chromates heretofore known. Among other advantages, the magnesium chromate produced by this invention possesses that of very great solubility and an advantage which is very important in oxidation processes of organic chemistry, in that on reduction it produces salts which are very soluble. Another advantage is the cheapness of the magnesium salt as compared with alkali metal salts.

This invention is illustrated by the following examples:

1. 100 parts of calcium chromate are boiled with a solution of an equi-molecular amount of magnesium sulphate in 1000 parts of water, using a reflux condenser, and while stirring well until the residue of a test portion, on being filtered and washed, appears as a whitish-gray slime which is no longer of a yellow color. The reaction is finished after about six to eight hours. After the mixture has cooled, it is filtered, the gypsum residue is washed, and the filtrate is evaporated. When the necessary concentration is reached the magnesium chromate separates out in the form of strong yellow mono-clinic prisms.

2. The reaction can be hastened and the consumption of solvents diminished by operating under pressure at temperatures above 100° C. Also in this way the dissolving of gypsum in disturbing amounts can be avoided.

3. 171 parts by weight of crystalline sodium chromate are dissolved hot in an equal amount of water and 100 parts of crystalline magnesium chloride are dissolved in 100 parts of water. The two solutions are mixed and evaporated in a vacuum at about 30–35°, it being preferable to allow the sodium chromate solution to run slowly into the magnesium chloride solution during the vacuum distillation. Very soon sodium chloride separates out in a crystalline form. As soon as the formation of magnesium chromate crystals sets in, the reaction is interrupted, the mixture is filtered, and the filtrate is further evaporated. Immediately magnesium chromate begins to crystallize out with only very small amounts of sodium chloride. It is obtained perfectly pure by re-crystallization from a concentrated solution.

4. The double decomposition with magnesium sulphate is carried out in the same way. Equi-molecular concentrated solutions of sodium chromate or potassium chromate and magnesium sulphate are mixed and evaporated in a vacuum at about 40° C. The alkali metal sulphate separates out quickly. It is filtered off and the solution is worked up further for magnesium chromate.

5. A concentrated solution of 60 parts by weight of sodium bichromate is mixed with a saturated solution of 50 parts of crystalline magnesium chloride and the solution is evaporated in a vacuum at a temperature which is not allowed to go above 40° C. After most of the sodium chloride has separated out, the mixture is filtered while warm on a suction filter which has previously been warmed. The filtrate solidifies in the cold to a paste of magnesium bichromate crystals.

Of course, the process can also be carried out in such a way that magnesium bichromate and sodium bichromate are produced at the same time. One method of carrying out this process commercially is by mixing sodium chromate with the required amount of sulphuric acid and magnesium sulphate, carrying out the double decomposition in the warmth, separating the solution of magnesium bichromate from the precipitated sodium sulphate by suction filtering after the mixture has cooled, and then subsequently washing the paste of sodium sulphate crystals with a small amount of concentrated magnesium sulphate solution.

It is not necessary to exercise as much care to keep the temperatures low in the case of the double decomposition of alkali metal bichromates with magnesium salts as in the case of the preparation of neutral chromates, because in the former case the tendency for double salts to form is not as great.

In the appended claims by the term "alkali-forming metal" we mean a metal of the alkali or alkaline earth groups.

We claim:

1. A process of preparing magnesium chromates which comprises reacting a chromate of an alkali-forming metal with a magnesium salt of an acid which forms with the alkali-forming metal a salt which is more difficultly soluble in water than the magnesium chromate.

2. A process of preparing magnesium chromates which comprises reacting in the presence of water a chromate of an alkali-forming metal with a magnesium salt of an acid which forms with the alkali-forming metal a salt which is more difficultly soluble in water than the magnesium chromate.

3. A process of preparing a magnesium chromate which comprises reacting a chromate of an alkaline earth metal with a magnesium salt of an acid which forms with an alkaline earth metal a salt which is more difficultly soluble in water than the magnesium chromate.

4. A process of preparing magnesium chromate, which comprises reacting a monochromate of an alkali-forming metal with a magnesium salt of an acid which forms with an alkali-forming metal a salt which is more difficultly soluble in water than the magnesium chromate.

5. A process of preparing magnesium chromate, which comprises reacting in the presence of water a monochromate of an alkali-forming metal with a magnesium salt of an acid which forms with an alkali-forming metal a salt which is more difficultly soluble in water than the magnesium chromate.

6. A process of preparing a magnesium chromate, which comprises reacting a monochromate of an alkaline earth metal with a magnesium salt of an acid which forms with an alkaline earth metal a salt which is more difficultly soluble in water than the magnesium chromate.

7. A process of preparing a magnesium chromate, which comprises reacting a calcium chromate with magnesium sulfate in a hot aqueous solution and separating the calcium sulfate so formed from the reaction mixture.

8. A process of preparing magnesium chromate, which comprises reacting calcium monochromate with magnesium sulfate in a hot aqueous solution and separating the calcium sulfate so formed from the reaction mixture.

In testimony whereof, we affix our signatures.

GEORG KRÄNZLEIN.
ARTHUR VOSS.